(12) United States Patent
Metz et al.

(10) Patent No.: US 7,655,300 B2
(45) Date of Patent: Feb. 2, 2010

(54) TRANSPARENT ZEOLITE-POLYMER HYBRID MATERIAL WITH TUNABLE PROPERTIES

(75) Inventors: Hans Joachim Metz, Frankfurt am Main (DE); Gion Calzaferri, Bern (CH); André Devaux, Liebefeld (CH); Stephane Suarez, Bern (CH); Andreas Kunzmann, Staufen (CH)

(73) Assignees: Clariant International Ltd., Muttenz (CH); Universitat Bern, Bern (CH); Optical Additives GmbH, Staufen (CH)

( * ) Notice: Subject to any disclaimer, the term of this patent is extended or adjusted under 35 U.S.C. 154(b) by 0 days.

(21) Appl. No.: 11/823,975

(22) Filed: Jun. 29, 2007

(65) Prior Publication Data

US 2008/0014451 A1    Jan. 17, 2008

(30) Foreign Application Priority Data

Jun. 29, 2006   (EP)   ................................. 06013435

(51) Int. Cl.
  *B32B 5/16*   (2006.01)
(52) U.S. Cl. ................... 428/327; 428/1.51; 502/64
(58) Field of Classification Search ............... 264/425; 423/700–718; 428/1.51, 327; 525/455; 502/4, 502/60, 64
  See application file for complete search history.

(56) References Cited

U.S. PATENT DOCUMENTS 5,084,529 A * 1/1992 Crano ..................... 525/455
6,296,938 B1 10/2001 Masaaki 6,977,768 B2 * 12/2005 Yamaguchi ................. 359/326

FOREIGN PATENT DOCUMENTS

EP 0826822 3/1998
WO WO 02/36490 5/2002

OTHER PUBLICATIONS

"Solubilisation of dye-loaded zeolite L nanocrystals" Devaux et al. published Aug. 29, 2005.*
"Preparation and optical transparency of composite materials from methacrylate ester copolymers and faujasites with an embedded azo dye". Schneider et al. published Aug. 24, 2000.*
EPO Search Report for EP 06013435, mailed Sep. 6, 2006.
Schubert, "Monatshefte fur Chemle Chemical Monthly an International Journal of Chemistry—Applied Chemistry: Synthesis of Zeolite L. Tuning Size and Morphology," vol. 136/No. 1 pp. 75-89; Jan. 2005.

* cited by examiner

*Primary Examiner*—Timothy M Speer
*Assistant Examiner*—Lauren Robinson
(74) *Attorney, Agent, or Firm*—Anthony A. Bisulca

(57) ABSTRACT

The invention is about the preparation of novel highly transparent zeolite-doped polymer and zeolites monolayers.

External coating of the zeolite crystals by covalently linked functionalized alkoxysilane derivatives allows for an efficient dispersion of the nano zeolite particles into an organic liquid monomer; the following co-polymerisation process leads to a hard, insoluble and transparent material containing said zeolites. Optical properties such as colour, refractive index, Abbe number or photochromism can be fine tuned by simply changing zeolite loading, while transparency is maintained.

9 Claims, 1 Drawing Sheet

TRANSPARENT ZEOLITE-POLYMER HYBRID MATERIAL WITH TUNABLE PROPERTIES

Embedding inorganic particles into organic matrice is a versatile method to add new features to a defined material. These novel properties can, in turn, be used in the development of devices such as infrared plastic light-emitting diodes for use in telecommunications, dye nanostructured materials for optical data storage or for improvement of chemical-physical properties of a polymer. For optical applications, particles are inserted into a matrix while transparency is maintained. To reach this goal several factors need to be considered. As light scattering strongly depends on the particle size, aggregation must be prevented. Uncoated zeolite samples, for example, show characteristic zeolite aggregates (white spots) of different sizes up to a diameter of 400 nm. Such aggregates produce visible light scattering. On the other hand, coated zeolite samples show only the structure of the polymer.

It was the object of the invention to provide novel highly transparent zeolite-polymer hybrid material, a simple process for the preparation thereof as well as its use in the making of optical devices.

The present invention provides a transparent zeolite-polymer hybrid material comprising zeolite crystals dispersed in a polymer A, wherein
(i) the zeolite crystals have parallel channels and/or cavities inside the crystal and a
    crystal length of 20 to 7000 nm,
(ii) the channels and/or cavities of the zeolite crystals contain guest molecules, clusters or ions,
(iii) the zeolite crystals are surface-coated with a polymerizable silane,
(iv) polymer A is a transparent organic polymer.

Preferably, polymer A is selected from the group consisting of polyolefines, polysiloxanes, polyacrylates, polymethacrylates, polyvinyls, polyesters, polycarbonates, and polyurethanes.

Polymer A is obtainable by common polymerization processes of the respective monomers by methods known to the skilled artisan.

Examples of polymer A or suitable starting products for manufacturing polymer A include:

polyol(allyl carbonate) monomers, e.g., allyl diglycol carbonates such as diethylene glycol bis(allyl carbonate), which monomer is sold under the trademark ®CR-39 by PPG Industries, Inc.;

poly(urea urethane) polymers, which are prepared, for example, by the reaction of a polyurethane prepolymer and a diamine curing agent, a composition for one of such polymers being sold under the trademark ®TRIVEX by PPG Industries, Inc.;

polyol(meth)acryloyl terminated carbonate monomer; diethylene glycol dimethacrylate monomers; ethoxylated phenol methacrylate monomers;

diisopropenyl benzene monomers; ethoxylated trimethylol propane triacrylate monomers; ethylene glycol bismethacrylate monomers; poly(ethylene glycol) bismethacrylate monomers; urethane acrylate monomers; poly(ethoxylated bisphenol A dimethacrylate); poly(vinyl acetate); poly(vinyl alcohol); poly(vinyl chloride);

poly(vinylidene chloride); polyethylene; polypropylene; polyurethanes;

polythiourethanes; thermoplastic polycarbonates, such as the carbonate-linked resin derived from bisphenol A and phosgene, one such material being sold under the trademark ®LEXAN; polyesters, such as the material sold under the trademark ®MYLAR; poly(ethylene terephthalate); polyvinyl butyral; poly(methyl methacrylate), such as the material sold under the trademark ®PLEXIGLAS, and polymers prepared by reacting polyfunctional isocyanates with polythiols or polyepisulfide monomers, either homopolymerized or co- and/or terpolymerized with polythiols, polyisocyanates, polyisothiocyanates and optionally ethylenically unsaturated monomers or halogenated aromatic-containing vinyl monomers. Also contemplated are copolymers of such monomers and blends of the described polymers and copolymers with other polymers, for example, to form block copolymers.

Especially preferred is a polymer made from diethylene glycol bis-allyl carbonate, hereinafter called ®CR-39. CR-39 can be obtained by polymerizing the liquid monomer diethylene glycol bis-allyl carbonate with 3 to 6 w/w % of dibenzoyl peroxide as an initiator. The two allyl groups allow a cross-linking polymerization giving a hard, insoluble and transparent material.

The amount of the zeolite crystals dispersed in polymer A is preferably 0.1 to 40% by volume, e.g. 0.5 to 25% by volume, relative to the total volume of the hybrid material.

In the present invention zeolites are understood as alumosilicates containing free hydroxyl groups and having parallel channels and/or cavities inside the crystal and a crystal length of 20 to 7000 nm, preferably 30 to 3000 nm.

Zeolite L is of particular interest. Zeolite L is a cylindrically shaped, porous aluminosilicate with a crystal length in the range of 30 to 7000 nm and featuring hundreds thousands of strictly parallel channels. The diameter of the channel opening is about 0.7 nm and the largest free diameter is about 1.3 nm, making zeolite L an ideal host material for the supramolecular organisation of monomeric dyes.

The guest species loaded into the zeolite cavities are protected from the environment while still offering their optical characteristics to the hybrid material. For example, photochromic and/or remarkable photoluminescence properties can be achieved through insertion into zeolites of organic compounds, especially derived from organic dyes and pigments, e.g. biphenyls, terphenyls, quaterphenyls, tetracenes, perylenes, triphendioxazines, acridines, stilbenes, azobenzenes, oxazolyl benzenes, styryl benzenes, fluorenone, isoviolanthrones, C.I. Solvent Orange 63, C.I. Solvent Yellow 98, 43, 44, C.I. Solvent Green 5, thioindigo compounds, and spiropyrans, naphthopyrans, carotenoids, carotenes, xanthenophylles, flavines, pyronines, oxazines, thionines, resorufine, methylviologen, carbocyanines, or inorganic compounds such as silver halides, e.g. silver chloride, silver sulfide, titanium dioxide, silicon dioxide, silicon nitride, lead sulfide.

Incorporation of high refractive index (RI) components, like $TiO_2$, $SiO_2$, SiN, $Ag_2S$, PbS, Si-clusters, in zeolite channels might lead to an increase in the RI of organic glass lenses based on polymer A. These results provide a promising method for developing optical devices such as lenses, special mirrors, filters, polarizer, grids, optical storage, monitors, window panes, float glass.

The amount of the guest molecules or ions in the zeolite crystals is judiciously 3 to 6 weight % (M/M), relative to the weight of the unloaded zeolite. Loadings up to 10% can be achieved.

The present invention also provides a process of preparing a transparent zeolite-polymer hybrid material as described above, comprising
(i) loading zeolite crystals with guest molecules or ions,
(ii) coating the surface of the loaded zeolite crystals with a polymerizable silane, (iii) dispersing the coated zeolite crystals in a liquid monomer, as specified above, and (iv) polymerizing the polymerizable silane and the liquid monomer to form a polymer A wherein said zeolite crystals are dispersed.

Like the Russian nested dolls principle, the general process of the invention is based on the insertion of optically active compounds (dyes, high refractive index elements, elements providing high or negative Abbe' numbers) inside coated zeolites crystals, themselves incorporated inside polymer A (FIG. 1). Furthermore, such a matrix offers protection to zeolites preventing oxygen and water interaction. Thus, even sensitive dyes like xanthene dyes or thioxanthones can be used in the development of stable materials.

Figure 1:
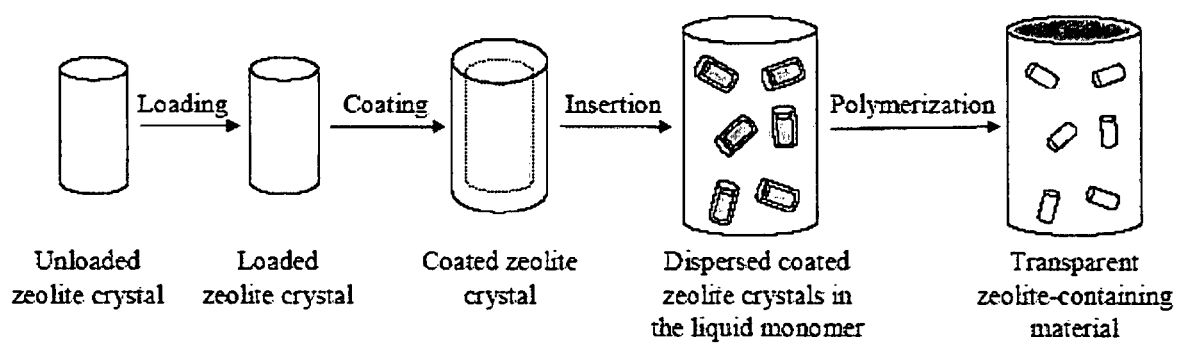
FIG. 1 illustrates the process of inserting optically active compounds inside zeolite crystals and themselves being dispersed within a polymer.

Before loading the zeolite crystals with the desired guest molecule, it is judiciously preferred to control the environmental conditions, such as pH, counter ions, water or gas content, by partially or fully exchanging the zeolite counter ions.

Solid state acidity therefore can be tuned by exchanging the zeolite counter ions. Surprisingly a strong modulating effect in the series Na>K>Cs on solid state acidity was found which allows to buffer the strong acidity of a sodium zeolite by exchange with $Cs^+$ ions. Acid sensitve dyes may serve as indicators.

Zeolite particles usually have low dispersion stabilization in the liquid monomer, which leads to rapid sedimentation. It was found that this drawback can be overcome by modifying hydroxyl groups on the surface of the zeolite crystals with a silane containing at least one terminal olefinic double bond or containing a leaving group such as a halide or an alkoxy. Examples for such silanes are:

Trivinylethoxysilane: $CH_3CH_2OSi(CH=CH_2)_3$,

Methacryloxymethyltrimethoxysilane:

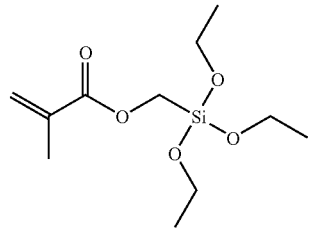

Ethoxy(dimethyl)vinylsilane:

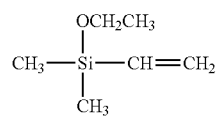

Ethoxytriallylsilane:

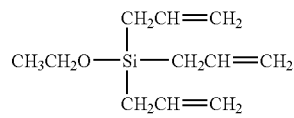

Dimethoxymethylvinylsilane:

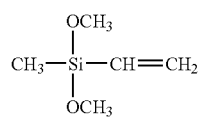

Diethoxymethylvinylsilane:

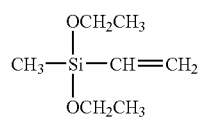

3-(Diethoxymethylsilyl)propyl methacrylate:

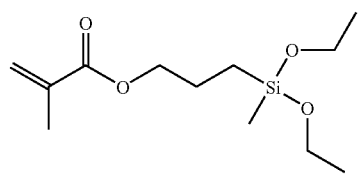

Vinyltrimethoxysilane:

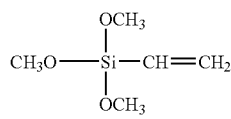

Allytrimethoxysilane:

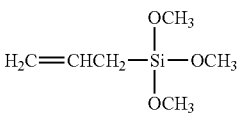

Triethoxyvinylsilane:

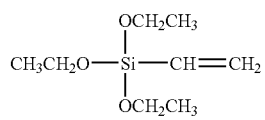

Allytriethoxysilane:

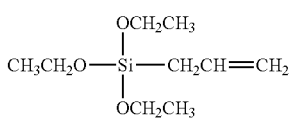

Triallyloxyvinylsilane:

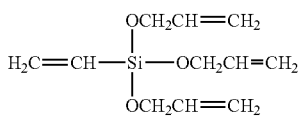

Triacetoxy(vinyl)silane:

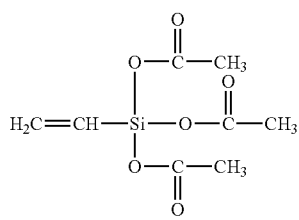

Trimethoxy(7-octen-1-yl)silane:

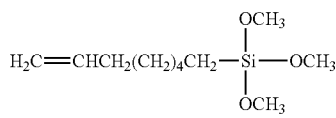

Triisopropoxyvinylsilane:

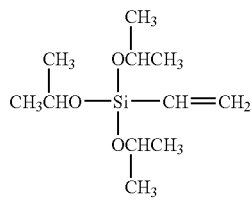

3-(Trimethoxysilyl)propyl methacrylate:

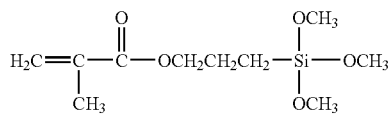

Tris(2-methoxyethoxy)(vinyl)silane:

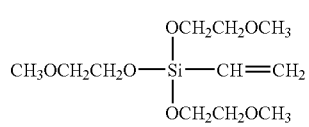

3-[Tris(2-methoxyethoxy)silyl]propyl methacrylate:

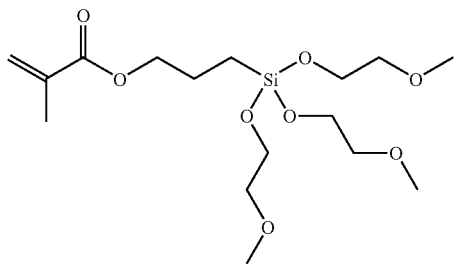

Most preferred silane as coating material is trivinyl-ethoxysilane and methacryloxymethyltrimethoxysilane which can advantageously be used for coating the zeolite and introducing it in both ®CR-39 and polymethylmethacrylate.

For a good coating of the entire surface of zeolite, loaded zeolite crystals and the polymerizable silane are combined in an inert organic solvent, such as toluene, benzene, xylene, ethers and esters, and treated at a temperature between 10 and 200° C., preferably between 20 and 150° C. The necessary amount of the silane relative to the zeolite crystals can be estimated by the specific surface area of the zeolite material. A rough guideline would be to estimate the demand to 24 mg/m² corresponding to 0.5 up to 10 monolayers of silane.

High transparency of polymer A has to be maintained upon incorporation of zeolites. Due to its organic nature, the liquid monomer to form polymer A is not able to well solubilise inorganic compounds such as zeolites. Zeolite surface modification with silane derivatives, as described in the foregoing, diminishes aggregation and improves the dispersibility of zeolites in the liquid monomer. Said silanes render the zeolite particles organophiliic in the outer region while preserving intact the inorganic host channels and cavities.

The coating covalently linked to zeolite crystals plays two roles. Firstly, it increases interactions with the liquid monomer allowing a more efficient dispersion of the crystals. Secondly, the polymerisation suppresses entirely microphase separation. As a result, coated zeolites gave rise to highly transparent doped polymer.

After dispersion of the coated zeolite crystals in the liquid monomer, the mixture is polymerized according to the procedures commonly used for the respective pure polymer. During this step, (co)polymerization of the polymerizable silane as well as (co)polymerization of the liquid monomer take place.

Since the outer surface modification has no impact on the conditions found inside of the zeolite L, their channels and/or cavities can be loaded with a wide array of guest species prior to this step. Optical characteristics of the guests, such as colour, photochromism, Abbe number or refractive index, can be used to tune the properties of the hybrid material.

Another embodiment of this invention is the preparation of transparent oriented zeolite monolayers on substrates like organic and inorganic glasses, which strongly scatter visible light if no precautions are taken. This phenomenon disappears completely when the monolayers are covered with for example CR39, giving rise to transparent, unidirectional zeolite containing material.

To build zeolite monolayers, a glass surface is chemically activated with silane derivatives, such as 3-chloropropyltrimethoxysilane. Then, zeolites are reacted through hydroxyl groups on the functionalised glass surface leading, after washing, to compact monolayers. These are finally covered with liquid monomers as specified above and hardened to give rise to transparent material containing unidirectional zeolite monolayers covered with polymer A. In this embodiment, a modification of zeolite surface is not necessary, as aggregates are washed from the glass plate prior to polymer coverage and microphase separation does not play a big role in the monolayer.

Another possibility is to use glues with a high refractive index like cyanoacrylates such as methyl-2-cyanoacrylate. The glue covers the monolayer, and another sheet of glass or hard polymer can be stacked on. The glue can be a derivate of acrylics, epoxy, polyurethane.

As the size of the channels enforce a preferential direction of the incorporated dyes, two different functions can be envisaged. By using the stop-cock principle as described in WO 02/36490 A1, a transparent mono-directional light emitting material can be obtained. By selecting an appropriate dye, total internal reflection can take place, thus transferring harvested light to a specific place of the material for energy conversion.

For example, UV-Vis absorption spectrum of a-xanthene loaded zeolite L monolayer measured before ®CR-39 coverage does not reveal the characteristic absorption bands of the dye, light scattering being too strong thus impeding the measurement by rendering the sample optically opaque. Examination of absorption spectra of CR39, xanthene-loaded zeolite monolayer and xanthene-loaded zeolite monolayer covered with ®CR-39 on glass substrate, in comparison to monolayer covered with polymer demonstrates this effect: Only the polymer covered monolayer allows to observe the xanthene absorption band around 580 nm.

EXAMPLES

Disc-shaped zeolites were synthesized according to the procedure in Monatshefte fur Chemie 136, 77-89 (2005).

Nanosized zeolite L and Hostasol Red GG were obtained from Clariant Produkte (Deutschland) GmbH.

Example 1

Pre-treatment of Zeolite Crystals to Control Internal Aciditiy 0.1 g of nano zeolite L were suspended in 10 ml of a caesium nitrate (1 mmol/l) solution. The suspension was left stirring at 60° C. for 12 h. After centrifugation, the exchanged material was washed twice with deionized water and dried in an oven at 80° C. for 12 h.

Example 2

Zeolite Surface Modification with Alkoxysilanes

Trivinylethoxysilane (0.4 ml) was added to a suspension of zeolite L (0.100 g) in toluene (4 ml). The mixture was refluxed for 16 h at 110 ° C. After centrifugation, the residue was washed once with toluene, and dried at 80° C. for 12 h.
Yield: Quantitative Example 3

Copolymerisation of Liquid Monomer with Surface Modified Zeolite Crystals 1 ml of the liquid monomer diethylene glycol bis allyl carbonate was added to a glass mold containing from 1 to 5% w/w of surface treated nano sized zeolite L (Example 2). After vortex mixing for 30 s the mixture was sonicated at 60° C. for 30 min. Dibenzoyl peroxide (0.030 g) was added and the mixture was sonicated again at 65° C. until gel formation took place. The sample was left in the oven at 80° C. for 48 h.

Example 4

Preparation of Hybrid Material with ®Hostasol Red GG Loaded Zeolite L

Zeolite L nanocrystals were first exchanged with $Cs^+$ according to the procedure in Example 1, before loading them with Hostasol Red GG. The organic dye was inserted via a gas phase adsorption process. 0.73 mg of a Hostasol Red GG was added to 100 mg of zeolite L in a glass ampoule. This mixture was dried at 110° C. for 16 h, at a pressure of $6 \times 10^{-2}$ mbar. The ampoule was then sealed off under vacuum and the insertion took place in a rotating oven for 24 h at 250° C. The product was washed with dry toluene in order to remove dyes adsorbed to the outer surface of the zeolites. The surface of the cleaned crystals was then modified with trivinylethoxysilane by the method mentioned above in Example 2.

60 mg of the dried, loaded and modified material was finely divided to give a fine powder, suspended in 6 ml of toluene, and sonicated for 30 min. For the copolymerisation step, 1 ml of diethylene glycol bis allyl carbonate was added to the suspension. Toluene was evaporated at 65° C. under vacuum ($6 \times 10^{-2}$ mbar) and sonication. 0.030 g of di-benzoyl peroxide was added and the mixture was sonicated at 65° C. until gel formation could be observed. The sample was then hardened in an oven at 80° C. for 48 h.

Example 5

Preparation of Hybrid Material with Oxonine Loaded Zeolite L

The nanosized zeolite L crystals were first exchanged with $K^+$ in order to reduce the internal acidity. This was carried out in a similar way as described in Example 1. 300 mg of the $K^+$-exchanged zeolite L were placed in a flask and suspended in 400 ml of water. 3 ml of an aqueous oxonine solution ($c = 6 \times 10^{-5}$ M) were added. The suspension was refluxed for 90 min, cooled to room temperature and centrifuged. The loaded zeolite was washed three times with 1-butanol. The surface of the cleaned crystals was then modified with trivinylethoxysilane by the method described in Example 2. 100 mg of the dried, loaded and modified material were reduced to a fine powder and added to 1 ml of diethylene glycol bis allyl carbonate. The mixture was vortex mixed for 30 s and sonicated for 30 min at 60° C. 0.030 g of di-benzoyl peroxide were added and the mixture was sonicated at 65° C. until gel formation could be observed. The sample was then hardened in an oven at 80° C. for 48 h.

Example 6

Zeolite Monolayers Coated with Polymer A

A glass plate (2 cm diameter, 2 mm width) was washed in a Caro's acid (mix of hydrogen perxoxide with sulfuric acid) for 3 h at 110° C., rinsed extensively with deionized water and placed into a flask containing toluene (10 ml). Then, 3-chloropropyltrimethoxysilane (0.4 ml) was added and the mixture was refluxed for 3 h under inert atmosphere.

A suspension of disk-like zeolite L (15 mg) in toluene (10 ml) was sonicated for 20 minutes. Then, the glass plate was added to the zeolite suspension and sonicated for another 30 minutes. The glass plate was sonicated in toluene for some seconds to remove physisorbed zeolites.

The prepared monolayer is now loaded with guest compounds. The loading procedure is identical to those described under example 4 and 5.

A mixture of liquid monomer diethylene glycol bis allyl carbonate (0.5 ml) and di-benzoyl peroxide (0.030 g) was heated at around 80° C. until the solution was viscous. One face of the glass plate was covered with that viscous solution and left in the oven for 48 h.

The invention claimed is:

1. A transparent zeolite-polymer hybrid material, comprising zeolite crystals dispersed in a transparent polymer A, wherein transparent polymer A is selected from the group consisting of polyolefins, polysiloxanes, polyacrylates, polyvinyls, polyesters, polycarbonates, and polyurethanes, wherein
   (i) the zeolite crystals have parallel channels, cavities inside the crystal or both and a crystal length of 20 to 7000 nm,
   (ii) the channels, the cavities inside the crystal or both of the zeolite crystals contain guest molecules, clusters or ions, and
   (iii) the zeolite crystals are surface-coated with a polymerizable silane.

2. The zeolite-polymer hybrid material as claimed in claim 1, wherein the transparent polymer A is made from diethylene glycol bis-allyl carbonate.

3. The zeolite-polymer hybrid material as claimed in claim 1, wherein the amount of the zeolite crystals dispersed in the transparent polymer A is from 0.1 to 40% by volume, relative to the total volume of the hybrid material.

4. The zeolite-polymer hybrid material as claimed in claim 1, wherein the guest molecules, clusters or ions are selected from the group consisting of organic dyes, organic pigments, silver halides, silver sulfide, titanium dioxide, silicon dioxide, silicon nitride, silicon clusters and lead sulfide.

5. The zeolite-polymer hybrid material as claimed in claim 1, wherein the polymerizable silane is a silane containing at least one leaving group, wherein the at least one leaving group is selected from the group consisting of alkoxy and halides, or contains at least one terminal olefinic double bond or contains both a leaving group and at least one terminal olefinic double bond.

6. The zeolite-polymer hybrid material as claimed in claim 5, wherein the polymerizable silane is trivinyl-ethoxysilane or methacryloxymethyl-trimethoxysilane.

7. An optical article having at least one surface, wherein the at least surface is coated with the transparent zeolite-polymer hybrid material as claimed in claim 1.

8. The optical article as claimed in claim 7, wherein the optical article is selected from the group consisting of lenses, eye glasses, special mirrors, filters, polarizer, grids, optical storage, monitors, window panes and float glass.

9. A coated organic or inorganic surface having anti-reflection properties or light wavelength transformation, wherein the coated organic or inorganic surface is coated with the transparent zeolite-polymer hybrid material as claimed in claim 1.

* * * * *